(12) United States Patent
Diessl et al.

(10) Patent No.: US 12,218,468 B2
(45) Date of Patent: Feb. 4, 2025

(54) PLUG ADAPTER FOR DOCKING ONTO A SOLENOID VALVE

(71) Applicant: WOCO Industrietechnik GmbH, Bad Soden-Salmunster (DE)

(72) Inventors: Björn Diessl, Büdingen (DE); Stefan Popov, Büdingen (DE); Stephan Thomas, Gelnhausen (DE)

(73) Assignee: WOCO Industrietechnik GmbH

( * ) Notice: Subject to any disclaimer, the term of this patent is extended or adjusted under 35 U.S.C. 154(b) by 944 days.

(21) Appl. No.: 17/314,481

(22) Filed: May 7, 2021

(65) Prior Publication Data
US 2021/0265794 A1 Aug. 26, 2021

Related U.S. Application Data

(63) Continuation of application No. PCT/EP2019/078719, filed on Oct. 22, 2019.

(30) Foreign Application Priority Data

Nov. 8, 2018 (DE) .................. 202018106353.7

(51) Int. Cl.
*H01R 31/06* (2006.01)
*F16K 31/06* (2006.01)
(Continued)

(52) U.S. Cl.
CPC ....... *H01R 31/065* (2013.01); *F16K 31/0675* (2013.01); *H01R 13/6271* (2013.01);
(Continued)

(58) Field of Classification Search
CPC .......... F01P 2007/146; F16K 31/0675; H01R 13/6271; H01R 31/065; H01R 2201/26; F02B 37/16
(Continued)

(56) References Cited

U.S. PATENT DOCUMENTS 6,354,674 B1 * 3/2002 Iwamoto ............. F15B 13/0832
303/119.3
8,182,274 B1 * 5/2012 Cheng .................... H01R 35/04
439/131
(Continued)

FOREIGN PATENT DOCUMENTS

CN 106229733 A * 12/2016
CN 107327591 A 11/2017
(Continued)

OTHER PUBLICATIONS

International Search Report and Written Opinion of the International Search Authority mailed Jan. 8, 2020 in International Application No. PCT/EP2019/078719 (English and German languages) (13 pp.).

*Primary Examiner* — Marcus E Harcum
(74) *Attorney, Agent, or Firm* — Banner & Witcoff Ltd.

(57) ABSTRACT

A plug adapter connects to a solenoid valve already mounted in a motor vehicle. The plug adapter has a plug connector for receiving an electrical control signal from a control unit of the motor vehicle for operating the solenoid valve. The plug adapter includes a solenoid valve connector for detachable coupling of the plug adapter to the plug connector of the solenoid valve. The solenoid valve connector and the plug connector are matched to one another in terms of plug form and electrical signal transmission. An electronics component, such as a microcontroller, processes an electrical output signal for operating the solenoid valve when an electrical connection is established between the electronics component and the solenoid valve via the solenoid valve connector when the plug adapter is plugged into the plug connector.

20 Claims, 12 Drawing Sheets

(51) Int. Cl.
*H01R 13/627* (2006.01)
*F01P 7/14* (2006.01)
*F02B 37/16* (2006.01)

(52) U.S. Cl.
CPC ......... *F01P 2007/146* (2013.01); *F02B 37/16* (2013.01); *H01R 2201/26* (2013.01)

(58) Field of Classification Search
USPC .................................................. 439/620.21
See application file for complete search history.

(56) References Cited

U.S. PATENT DOCUMENTS

| | | | | |
|---|---|---|---|---|
| 8,277,239 | B1 * | 10/2012 | Chan | H01R 31/065 |
| | | | | 439/669 |
| 8,818,612 | B2 * | 8/2014 | Das | G07C 7/00 |
| | | | | 701/32.7 |
| 9,343,850 | B2 * | 5/2016 | Colahan | H02M 7/003 |
| 9,930,796 | B2 * | 3/2018 | Fantin | H05K 1/181 |
| 10,025,325 | B2 | 7/2018 | Kerber et al. | |
| 2004/0211373 | A1 * | 10/2004 | Norris | F16K 31/508 |
| | | | | 123/41.1 |
| 2006/0006354 | A1 * | 1/2006 | Guler | E03C 1/057 |
| | | | | 251/129.04 |
| 2014/0261780 | A1 | 9/2014 | Thomas et al. | |
| 2016/0160738 | A1 * | 6/2016 | Na | F02M 26/17 |
| | | | | 123/41.08 |
| 2018/0013229 | A1 * | 1/2018 | Goulden | H01R 24/60 |
| 2018/0347448 | A1 * | 12/2018 | Morota | F16K 11/0856 |
| 2020/0080662 | A1 * | 3/2020 | Baasch | F16K 31/0613 |
| 2020/0386331 | A1 * | 12/2020 | Chapman | F16K 27/065 |
| 2021/0265764 | A1 * | 8/2021 | Hachadorian | H01R 13/5213 |

FOREIGN PATENT DOCUMENTS

| | | | | |
|---|---|---|---|---|
| EP | 2 604 923 | A2 | 6/2013 | |
| FR | 2997801 | A1 * | 5/2014 | ......... H01R 13/6273 |
| JP | 3217205 | U * | 7/2018 | ............... B60L 53/16 |
| WO | WO-2017125378 | A1 * | 7/2017 | ............... B60L 1/14 |

* cited by examiner

PLUG ADAPTER FOR DOCKING ONTO A SOLENOID VALVE

PRIORITY

This application is a continuation application of International PCT Patent Application No. PCT/EP2019/078719 filed on Oct. 22, 2019, entitled "PLUG ADAPTER FOR DOCKING ONTO A SOLENOID VALVE," which claims priority to German Patent Application No. 20 2018 106 353.7 filed on Nov. 8, 2018, the entire contents of each of which are herein incorporated by reference.

TECHNICAL FIELD

The embodiments relate to an adapter for docking and/or connecting to a solenoid valve, in particular one already mounted in a motor vehicle. In some embodiments, it may be within a cooling circuit or turbocharger circuit of the motor vehicle, which has a plug connector arranged on a solenoid valve housing with a signal input for receiving an electrical control signal from a higher-level control unit of the motor vehicle for operating the solenoid valve. The embodiments also relate to a solenoid valve having a plug adapter. It is also an object of the embodiments to provide an arrangement or system comprising a control unit, a solenoid valve and a plug adapter, and a cooling circuit comprising such an arrangement or system.

BACKGROUND

Other options for controlling solenoid valves in motor vehicles involve connecting one solenoid valve directly to each power output of a control unit in the vehicle. However, due to the limited number of power outputs of a control unit, there is the problem that only a correspondingly limited number of actuators or solenoid valves, respectively, can be controlled via this type of connection.

It is already known to overcome this limitation on the number of power outputs by using Local Interconnect Network (LIN) technology. LIN technology, also called LIN bus, is a serial communication system for networking sensors and actuators and is used where the bandwidth and versatility of CAN is not required. Well-known examples of LIN applications include networking within the door or seat of a motor vehicle. A LIN consists of a master, usually consisting of a microcontroller, and one or up to 16 slaves or actuators, respectively, so that up to 16 solenoid valves can be controlled by means of a LIN. To establish a data connection between the LIN communication system and the control unit, the LIN master is connected to the CAN communication system of the vehicle as a bridge.

FIG. 1 shows a prior art method for controlling solenoid valves. The electrical signal inputs 12 of the solenoid valves 1 to N are each coupled to a separate power output 18 of a higher-level control unit 20, the control unit 20 being connected to a car battery 22 of the motor vehicle for its own power supply and the power supply of the solenoid valves 2. A microcontroller 24 of the control unit 20 thereby controls circuit breakers 26 S1 to SN associated with the respective power outputs 18 of the control unit 20 for each of the solenoid valves 2, the circuit breakers 26 being set to either an open or a closed position. A disadvantage of the illustrated method is, in particular, that only a limited number of solenoid valves 2 can be connected to the control unit 20, namely limited to the number at its power outputs 18. A further disadvantage is that the solenoid valves 2 are each subjected to a maximum current which is calculated to ensure safe opening of the valves 2 even at maximum opposing force. However, since the maximum current is only necessary in certain operating conditions such as high fluid pressure or fully closed valve, the arrangement shown causes unnecessarily high power consumption.

A system for controlling a solenoid valve via a LIN communication system known from U.S. Pat. No. 10,001,224 B2. Disclosed therein is a solenoid valve for a motor vehicle comprising a transmitter and a receiver and a microcontroller. The microcontroller exchanges data with the transmitter and the receiver and also has a function for controlling an actuator of the valve. The receiver receives temperature data about a transmission fluid of the motor vehicle via a local interconnect network (LIN) interface and sends the temperature data to the microcontroller. The microcontroller compares the received data with a threshold value and, depending on the calculated difference, applies a current to a solenoid coil of the actuator of the solenoid valve to adapt the valve position to the changed temperature state.

However, a major disadvantage of the disclosed system is that the components for connecting the valve to the LIN bus are installed in the valve housing itself, so that the valve, the microcontroller and the transmitter and receiver form an integral, inseparable unit. That means that the disclosed system cannot be used, in particular, for valves already installed in a motor vehicle that are to be connected to the LIN bus but for which no connection option to the LIN bus is provided. On the contrary, in order to be able to use the system, these valves would even have to be completely dismantled and replaced by the proposed valves, which would, however, require a great deal of work and expense.

SUMMARY

The embodiments provide a plug adapter through which a connection of solenoid valves already mounted in a motor vehicle to a higher-level serial bus system can be achieved.

According to one embodiment, the plug adapter may comprise a solenoid valve connector adapted to the plug connector of the solenoid valve for a detachable coupling of the plug adapter to the plug connector of the solenoid valve, wherein the solenoid valve connector and the plug connector are adapted to each other with respect to plug shape and electrical signal transmission, and an electronic component, in particular a microcontroller, for processing and/or controlling an electrical output signal for operating the solenoid valve, wherein, when the plug adapter is plugged into the plug connector, an electrical connection is established between the electronic component and the solenoid valve via the solenoid valve connector. For example, an inductive drive unit of the solenoid valve can be controlled by the electronic component, by means of which an actuator of the valve can be adjusted between an open position for releasing a fluid line and a closed position for closing the fluid line. When the plug adapter is not plugged into the plug connector, the electrical connection between the electronic component and the solenoid valve can be interrupted.

Furthermore, the solenoid valve connector adapted to the plug connector of the solenoid valve can have, for mechanical coupling, an in particular male plug piece for plugging into an in particular female mating piece of the plug connector of the solenoid valve, which is possible in particular only in a twisting position, a latching groove being formed in particular on the plug piece, in particular running perpendicularly to a plug direction, for latching with a complementary latching lug in the mating piece. For fluid-tight connection of the adapter to the plug connector, a sealing ring can also be provided which surrounds the plug piece.

In some embodiments, at least one electrical line is accommodated in and/or on the plug piece for the electrical connection of the electronic component to the operating element of the solenoid valve. For this purpose, the plug piece can have through-channels which open into an end face facing the plug connector and in which the lines are accommodated. It is further conceivable that the lines do not terminate flush with the end face, but end set back in the channels, so that corresponding pins of the plug connector can project into the channel openings located on the end face of the plug piece for contact with the lines.

In addition, the plug adapter can comprise a fluid-tight receptacle chamber with an in particular rectangular outline and with a wall surrounding the outline as well as an in particular transparent lid, wherein the electronic component is received and/or fixed in the receptacle chamber, and wherein the receptacle chamber can be closed or sealed in particular fluid-tight manner by means of the lid. For example, one or more hold-down devices can be integrally formed on the lid, which fix the electronic component to the bottom of the chamber when the receptacle chamber is closed with the lid. For fluid-tight closure of the receptacle chamber, a circumferential sealing element can further be accommodated in a rim of the lid, which sealing element rests on or against the wall of the receptacle chamber when the lid is placed on the receptacle chamber. It is further possible that the receptacle chamber extends substantially in a plane parallel to a plug direction of the adapter and/or the electronic component is received and/or fixed in the receptacle chamber in a plane parallel to the plug direction of the adapter and spaced from the plug piece. Due to the arrangement of the electronic component parallel to the plug plane, the adapter can have very compact dimensions. At the same time, the easily accessible accommodation chamber minimizes the maintenance effort, for example if a defect should occur in the electronic component or if it should be replaced by a differently configured electronic component.

Furthermore, at least one through-opening for the cable passage of the at least one electrical line and/or at least one data transmission line cable can be arranged in a chamber base of the receptacle chamber. The cables to be contacted with the electronic component can, for example, be introduced into the through-openings. For this purpose, the through-openings can open into through-channels which, on the one hand, open into the plug piece on the solenoid valve side at their end facing away from the receptacle chamber and, on the other hand, open into the plug receptacle on the control unit side at their other end.

In some embodiments, a circuit board of the electronic component has through-holes into which the electrical lines and/or at least one data transmission line are inserted, as a result of which the circuit board is held in the receptacle chamber of the adapter. The lines may further be soldered to the circuit board of the electronic component. Depending on whether or not the plug adapter has a data output on the control unit side in addition to the data input on the control unit side, five or six through-holes may be provided in the circuit board. Accordingly, the chamber base can also have five or six through-openings.

In addition, the lid can have at least one hold-down device on its side facing the receptacle chamber, by means of which the electronic component can be fixed in the receptacle chamber. The lid can be fastened to the wall of the receptacle chamber, for example by means of a latching mechanism, a screw or rivet connection or adhesive, in order to close the receptacle chamber.

In addition, for connecting the plug adapter to a higher-level control unit via a serial bus system and/or for connecting the plug adapter to a car battery of the motor vehicle, the plug adapter can have a plug receptacle adapted to a plug of the bus communication line of the bus system, to which the plug of the bus communication line is electrically and/or mechanically coupled or can be coupled. The plug receptacle, in particular the female plug receptacle, may have a border for receiving a corresponding male connector. The border may form the end face of the adapter. The plug receptacle may further comprise a receiving base recessed with respect to the border, wherein a wall of the border may surround the receiving base. The receiving base may include openings into which conduit channels associated with the receptacle chamber open. The control unit-sided lines to be connected to the electronic component may be inserted into the openings. The lines can protrude from the openings in a pin-like manner or end recessed in the openings, for contacting with a corresponding connector on the control unit side. A positioning element can be formed inside the wall of the border, which ensures that the connector on the control unit side can be connected in only one twisting position.

The plug receptacle can accommodate at least one data transmission line for establishing a data interface between the higher-level control unit and the electronic component, as well as at least one electrical line for establishing an electrical voltage supply between a car battery of the motor vehicle and the electronic component. The plug receptacle has two electrical lines for supplying power to the adapter in one embodiment. The plug receptacle may have a data transmission line for receiving data, for example LIN data. The plug receptacle can additionally have a further data transmission line for sending data to the control unit.

The plug adapter may further comprise a housing, wherein the solenoid valve connector and/or the receptacle chamber and/or the plug receptacle are integrally formed with the housing. The housing may be made of plastic. The plastic may be temperature-resistant, water-repellent, and/or resistant to oils. The housing can be formed of two half shells which are provided with each other.

In some embodiments, the housing has a main axis in the plug direction of the plug adapter, with the solenoid valve connector and the plug receptacle being arranged facing away from each other in the main axis at opposite ends of the housing. The end faces of the adapter may be orthogonal to the main axis. In particular, the end faces may be the perimeter of the plug receptacle and the end face of the plug piece. Preferably, the receptacle chamber of the electronic component does not protrude beyond the end face of the plug piece in the main axis direction.

In some embodiments, the receptacle chamber extends in an L-shape away from the main axis of the housing and is spaced parallel to the plug piece, at least in sections. The latching groove of the plug piece can face the rear side of the receptacle chamber. The latching groove can also be arranged on the plug piece facing away from the rear side of the receptacle chamber.

Furthermore, the housing can have at least one undercut latching lug on a housing section surrounding the plug receptacle for latching the plug of the bus communication line, wherein the latching lug can have an advancing slope rising in the plug-on direction and a latching plate arranged behind the advancing slope in the same plug-on direction, which can be engaged behind by a complementary mating connector of the plug. Preferably, the housing can have two latching lugs on two opposite housing sections.

For this purpose, the electronics component can be set up to receive at least one bus signal from the control unit via the bus communication line when the plug adapter is coupled to the control unit and to convert this at least one bus signal into at least one electrical control signal for actuating the solenoid valve, and to transmit the electrical control signal from the electronics component to the solenoid valve. The received signal may include information regarding operating parameters of a cooling circuit or turbocharger circuit of the motor vehicle. The received signal may include pressure or temperature information.

Some embodiments may include a solenoid valve, in particular already mounted in a motor vehicle, such as within a cooling circuit or turbocharger circuit of the motor vehicle, which comprises a plug connector arranged on a solenoid valve housing and having a signal input for receiving an electrical control signal of a control unit of the motor vehicle for operating the solenoid valve, wherein the solenoid valve may comprise a plug adapter as described above.

In this context, it may be provided that the plug connector for providing a clip connection with the solenoid valve connector has a latching lug which is designed to engage in the latching groove of the plug adapter. The plug connector can also have a manually operable element accessible from its outside, by means of which the latching connection can be released to detach the plug adapter from the solenoid valve.

Furthermore, the operating element of the solenoid valve can have an actuator with an electromagnetically actuated actuator and a solenoid coil, which can be controlled by means of the electrical control signal. The actuator can have an actuator by means of which a fluid line of the solenoid valve can be opened or closed. The actuator can be moved between the open position or the closed position. Furthermore, it is conceivable that the actuator can assume intermediate positions between the open position and the closed position.

Furthermore, it can be provided that the actuator of the solenoid valve closes the solenoid valve in its initial position and can be opened as a result of a control of the solenoid valve by means of an electrical control signal. It can also be provided that the actuator releases the solenoid valve in its initial position and can be closed as a result of a control of the solenoid valve by means of an electrical control signal.

Some embodiments may include an arrangement or system comprising a control unit and a solenoid valve, in particular already mounted in a motor vehicle, such as within a cooling circuit or turbocharger circuit of the motor vehicle, wherein the solenoid valve comprises a plug connector arranged on a solenoid valve housing and having a signal input for receiving an electrical control signal of a control unit of the motor vehicle for operating the solenoid valve, wherein the arrangement may comprise a plug adapter as described above. In other embodiments, a cooling circuit or turbocharger circuit may be provided for a motor vehicle having such an arrangement as previously described.

BRIEF DESCRIPTION OF THE DRAWINGS

Further features, advantages and characteristics of the invention can become apparent in the following description of preferred embodiments of the invention with reference to the attached drawings, which show:

FIG. 11(*b*) is a block diagram of a system on a chip arrangement of the LIN adapter components;

FIG. 12(*b*) is a block diagram of a system on a chip arrangement of the PWM adapter components.

DETAILED DESCRIPTION

Figure 2:
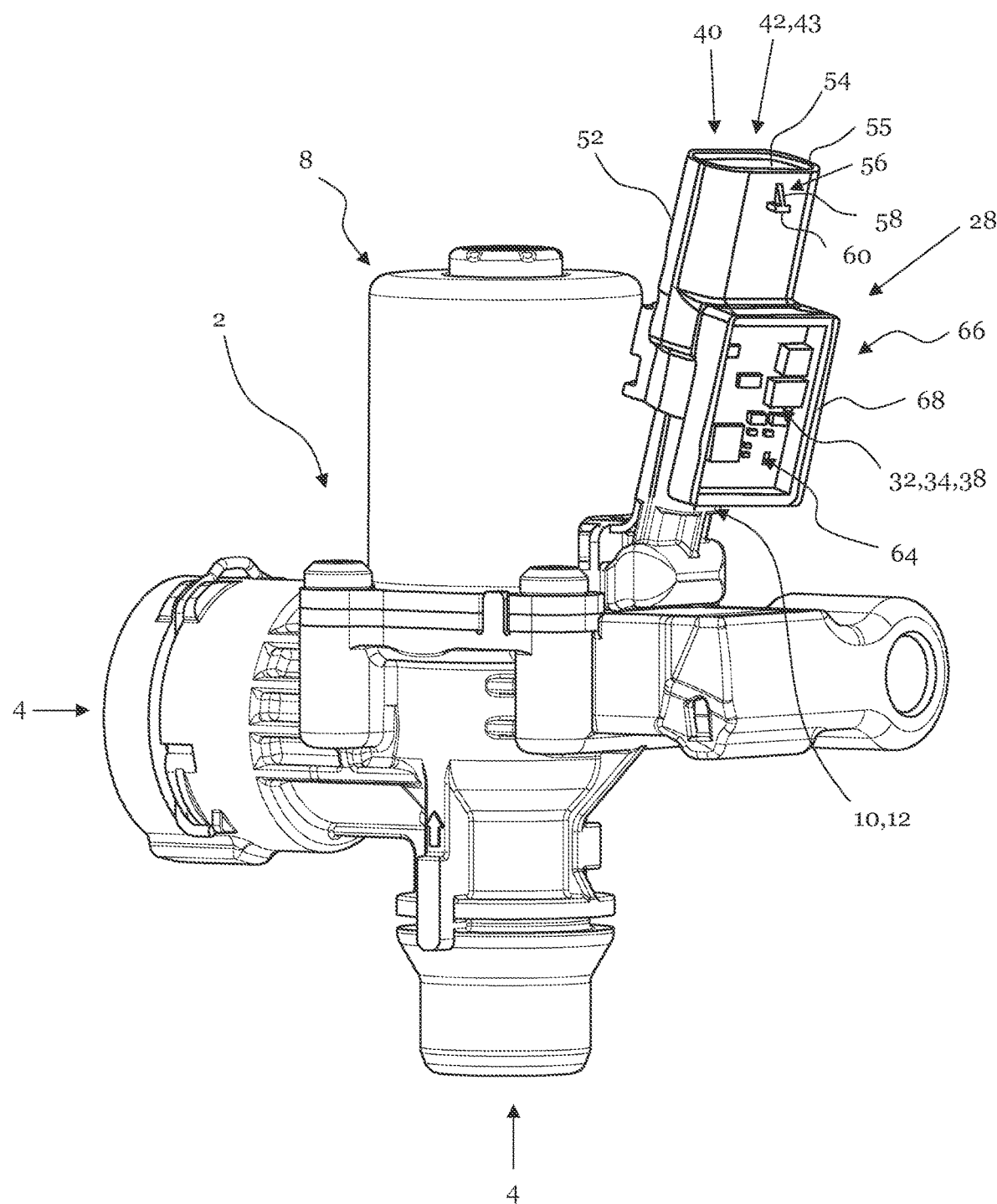
FIG. 2 is a side view of a solenoid valve with attached solenoid valve adapter.
Figure 3:
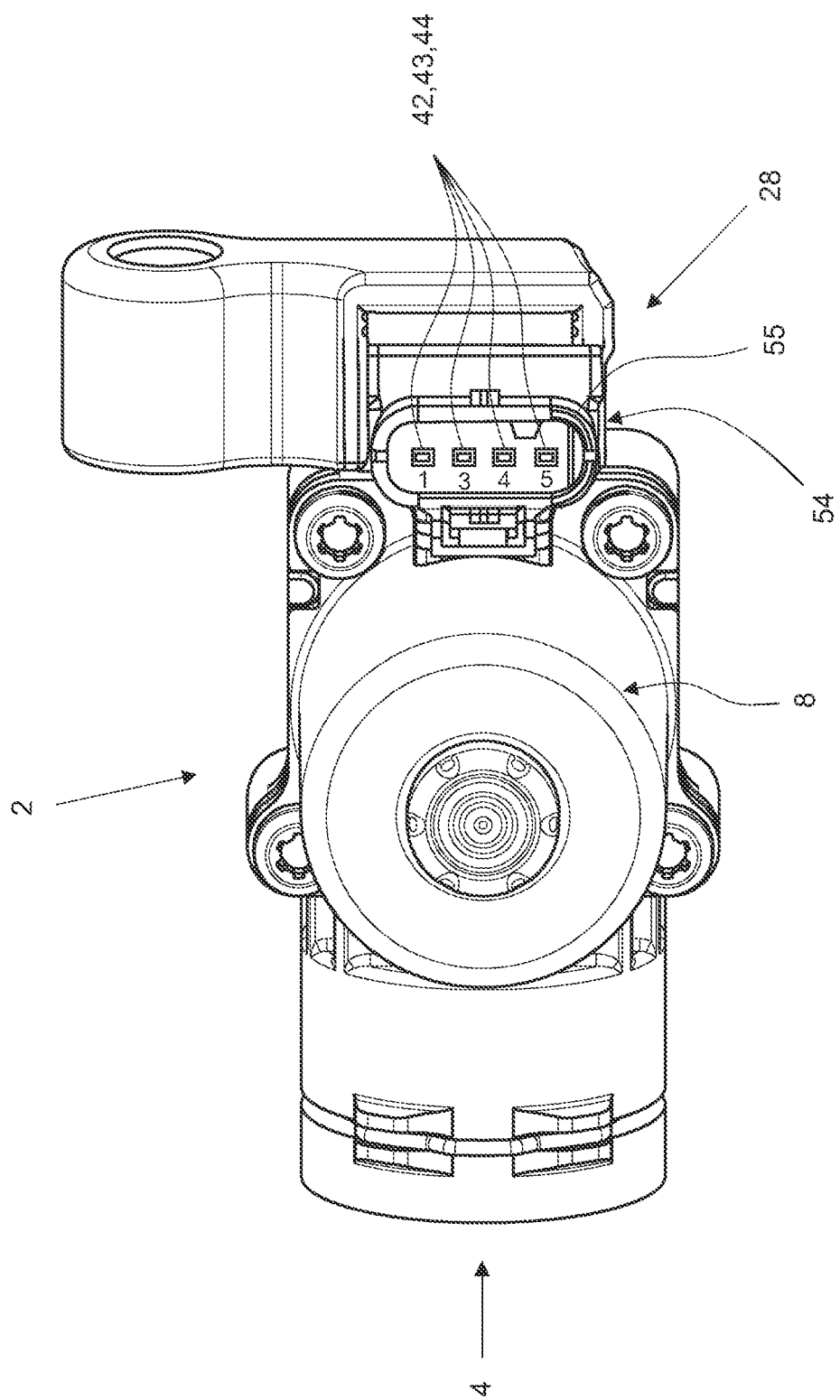
FIG. 3 is a top view of a solenoid valve with attached solenoid valve adapter.

FIGS. 2 and 3 show a solenoid valve adapter 28 plugged via the solenoid valve connector 62 onto a plug connector 10 of a solenoid valve 2. The plug receptacle 54 on the control unit side of the adapter for the data or power input 40, 42 can have, for example, three or, as shown in FIG. 3, four poles, depending on whether a data output 43 is provided in addition to the data input 42. Power input 40, 42 can have, for example, three or, as shown in FIG. 3, for example four poles, depending on whether, in addition to the data input 42, a data output 43 is provided, via which signals, for example relating to the variation in current intensity over time used for energizing the solenoid coil 14 accommodated in the electromagnetic drive unit 8, can be sent from the adapter 28 to the higher-level control unit 20 via the serial communication bus. For correct connection of a plug to the plug receptacle 54 of the adapter 28, the adapter 28 has a projection within a border 55 of the plug receptacle 54 which, together with a complementary mating element on the plug to be connected, permits connection of the plug in only one twisting position.

Figure 4:
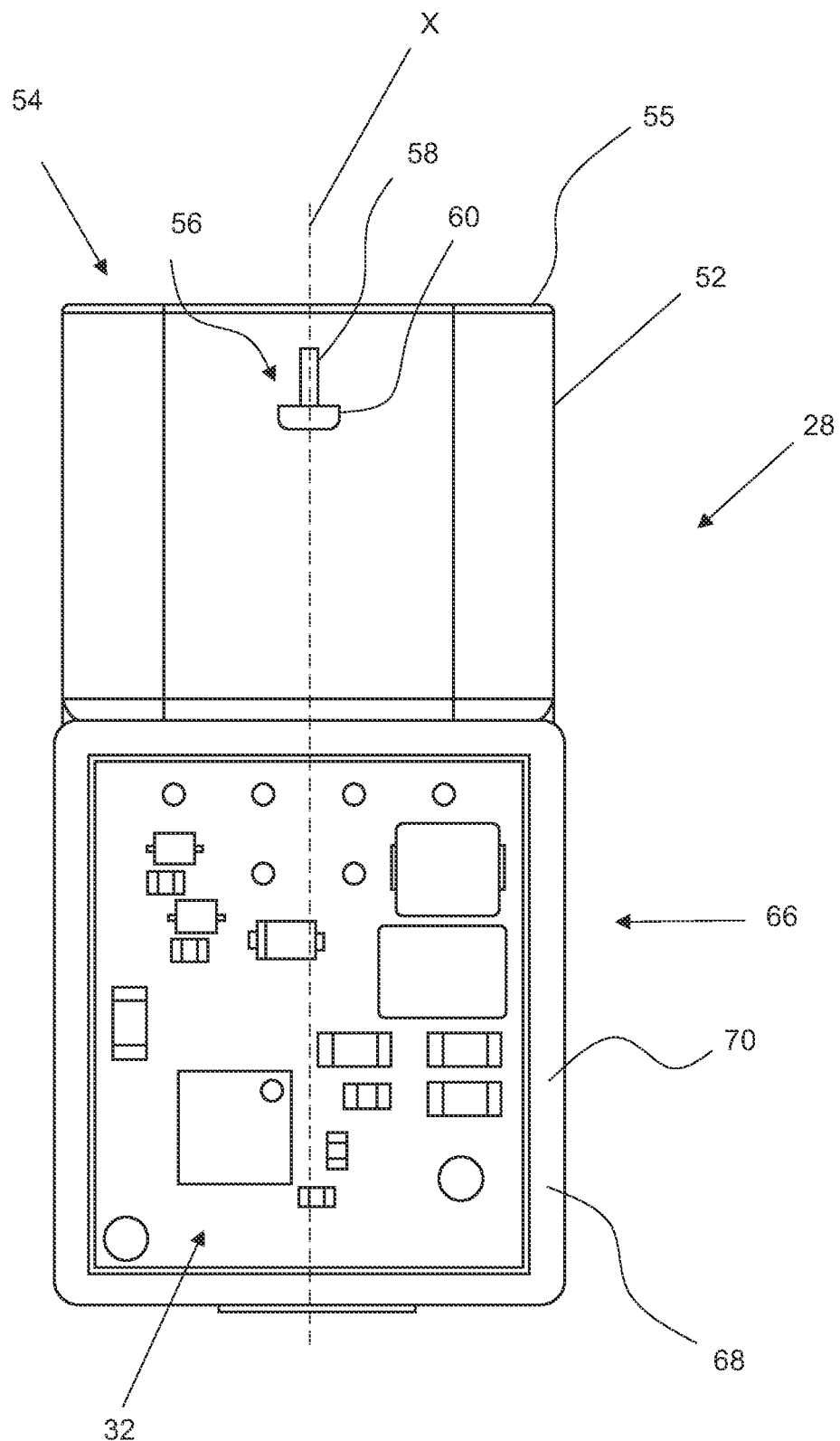
FIG. 4 is a front view of an exemplary solenoid valve adapter.

The solenoid valve adapter 28 shown in FIG. 4 comprises an adapter housing 52, which has on its upper side the plug receptacle 54 for connecting the adapter 28 to the higher-level control unit 20 on the one hand and for establishing a connection with the car battery 22 on the other hand. For fixing a compatible connector plug to the adapter 28, the latter has a latching lug 56 which comprises an advancing slope 58 and a latching plate 60 which, when the plug is connected, is engaged behind by a complementary element of the plug. In particular, it can be seen that the advancing slope 58 lying in the main axis X and the latching plate 60 extending perpendicularly to the main axis X are arranged in a T-shape relative to one another. Arranged at the lower end of the adapter housing 52 is the solenoid valve connector 62. Further accommodated in the adapter housing 52 is the electronic component comprising a circuit board 64 with hardware components soldered thereon, such as a microcontroller and/or a transceiver. For receiving the circuit board 64, the solenoid valve adapter 28 comprises a receptacle chamber 66 which is closable by means of a lid 68 which may be transparent, for example by a clip connection or an adhesive connection. The receptacle chamber 66 comprises a outline, in particular a rectangular outline, and a wall 70 with a height H surrounding this outline or the chamber bottom with a thickness D. The lid 68 has an edged border all around, which rests approximately vertically on an upper side of the wall 70 when the receptacle chamber 66 is closed with the lid 68. At an upper end of the circuit board 64, for example, five or six contact openings 72 are provided which extend through the circuit board 64 and serve for electrical contacting of the input-side and output-side data or current lines 73, 74, 76, 78, 80 with the circuit board 64.

Figure 5:
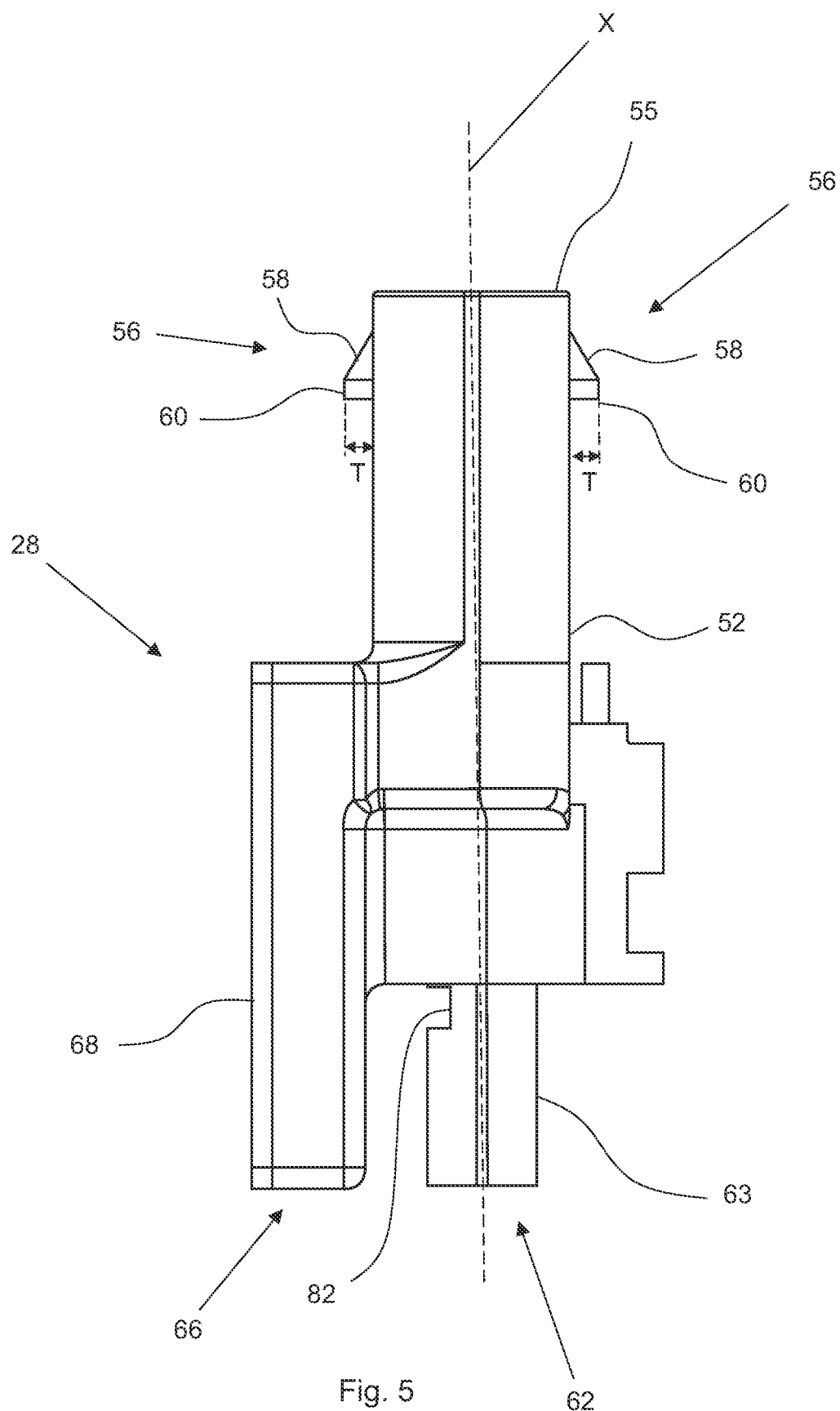
FIG. 5 is a side view of the exemplary solenoid valve adapter.

As shown in the side view of the solenoid valve adapter 28 shown in FIG. 5, the plug receptacle 54 and the solenoid valve port 62 are disposed at opposite ends of the adapter 28 and extend away from each other in opposite directions along a main axis X of the adapter 28. Further, it can be seen that the receptacle chamber 66 for receiving the hardware components extends in an L-shape away from the main axis X of the adapter 28 and is spaced in sections parallel to the solenoid valve port 62. The solenoid valve connector 62 has a plug piece 63 with an asymmetrical outer contour as well as a latching groove 82 extending essentially perpendicular to the main axis X or perpendicular to the direction of insertion of the adapter, which in cooperation with a complementary mating connector, such as a latching lug, within the plug connector 10 arranged on the solenoid valve 2 serves to secure the adapter 28 to the solenoid valve 2. Also to be seen are the latching lugs 56 arranged opposite each other on both sides of the adapter housing 52, with respective advancing slopes 58 and latching plates 60. The latching lugs 56 are arranged below the upper side of the adapter housing 52, with the latching plates 60 extending away from the adapter housing 52 by a height T perpendicular to the main axis X, wherein the advancing slopes 58 are arranged in front of the latching plates 60 in the plug-on direction of a plug. The advancing slopes 58 begin at their upper end at the level of the adapter housing surface, rise linearly to the height T of the latching plates 60 and end flush therewith. Furthermore, it can be seen that the plug receptacle 54, the latching lugs 56, the receptacle chamber 66 and the solenoid valve connector 62 are integrally designed with the housing 52. Thus, an interface is provided which can be programmed for and connected to any bus system and which can be plugged in a simple manner onto "classic", in particular already installed, solenoid valves 2.

Figure 6:
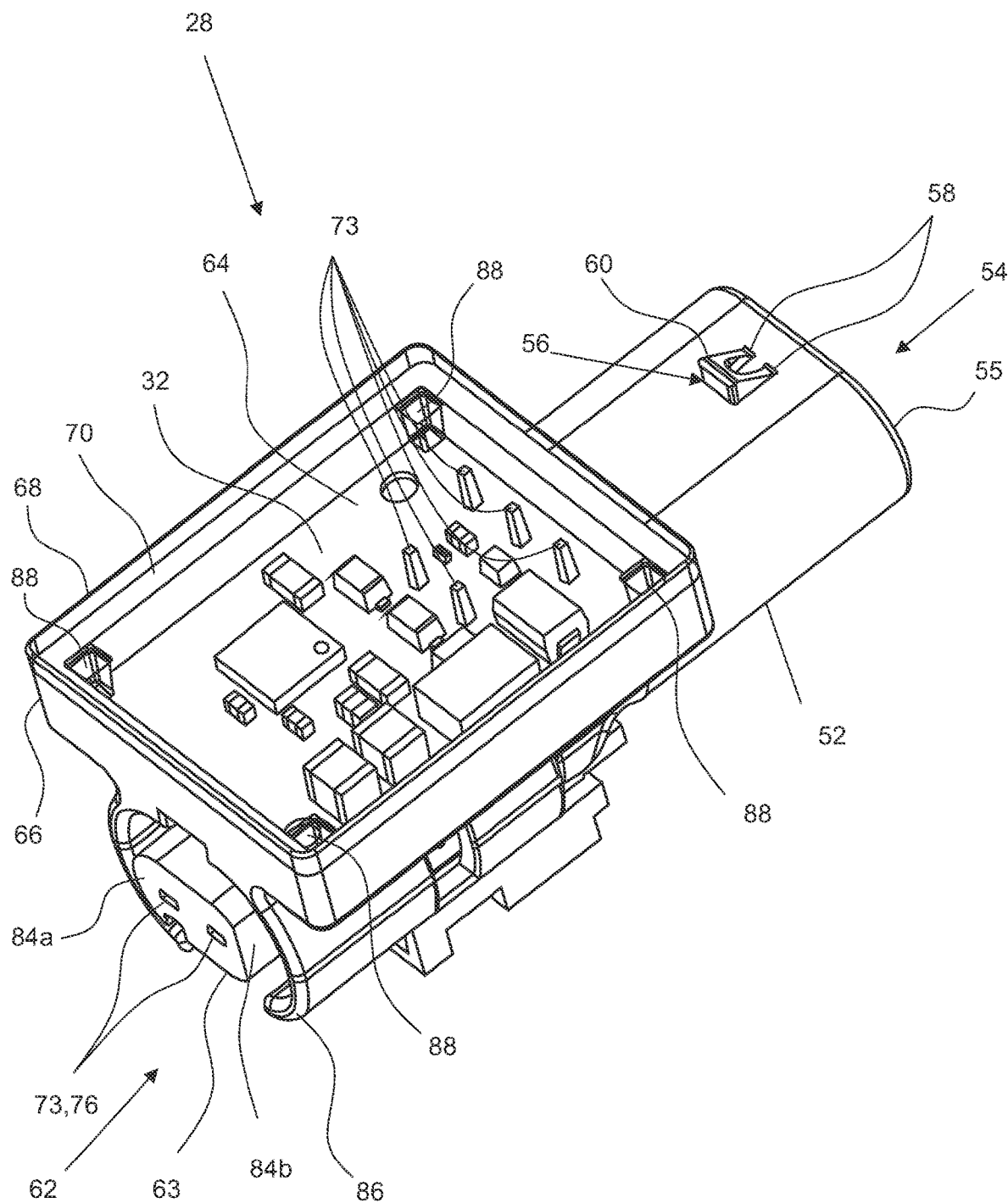
FIG. 6 is an oblique view of another exemplary solenoid valve adapter.

The solenoid valve adapter 28 shown in FIG. 6 has an alternative embodiment of a latching lug 56, wherein instead of only one advancing slope 58, it has two advancing slopes 58 which open into outer end portions of the latching plate 60 at a distance from each other. The two-pole solenoid valve connector 62 shown at the lower end of the solenoid valve adapter 28 has side sections 84a, 84b which are formed differently from one another in each case for correct connection of the adapter 28 to a solenoid valve 2, one of the sections 84a having a rounded outer contour and the respective other section 84b being flattened. This ensures that the adapter 28 can only be connected to the plug connector 10 of the solenoid valve 2 in a single twisting position. The solenoid valve connector 62 also visibly accommodates the two electrical lines 73 for contacting the electrical signal input 12 of the solenoid valve 2, which at their opposite ends open into the contact openings 72 of the circuit board 64 correspondingly provided for them. The illustrated embodiment of the adapter 28 further has a cage 86 which surrounds the solenoid valve connector 62 at a distance corresponding to the outer contour of the solenoid valve connector 62, which cage facilitates the fitting of the adapter 28 and serves for a secure connection of the adapter 28 to the plug connector on the solenoid valve side. In the illustrated embodiment, the closure element 68 has hold-downs 88 extending perpendicularly from the closure element in the direction of the bottom of the receptacle chamber 66, which on the one hand serve as a positioning aid for the closure element 68 and on the other hand fix the circuit board 64 in the receptacle chamber 66. The hold-downs 88 are formed on the closure element 68 in such a way that they each rest within corner regions of the wall 70 surrounding the receptacle chamber 66 and thus position the closure element 68. With the adapter 28 fully assembled as shown, the input and output power and data lines 74, 76, 78, 80 engage through the contact openings 72 of the circuit board 64 fixed in the receptacle chamber 66, thereby establishing electrical contact between the lines 74, 76, 78, 80 and the circuit board 64, and further, the circuit board 64 is positioned in the receptacle chamber 66 by the contacts engaging through it and is fixed in that position.

Figure 7:
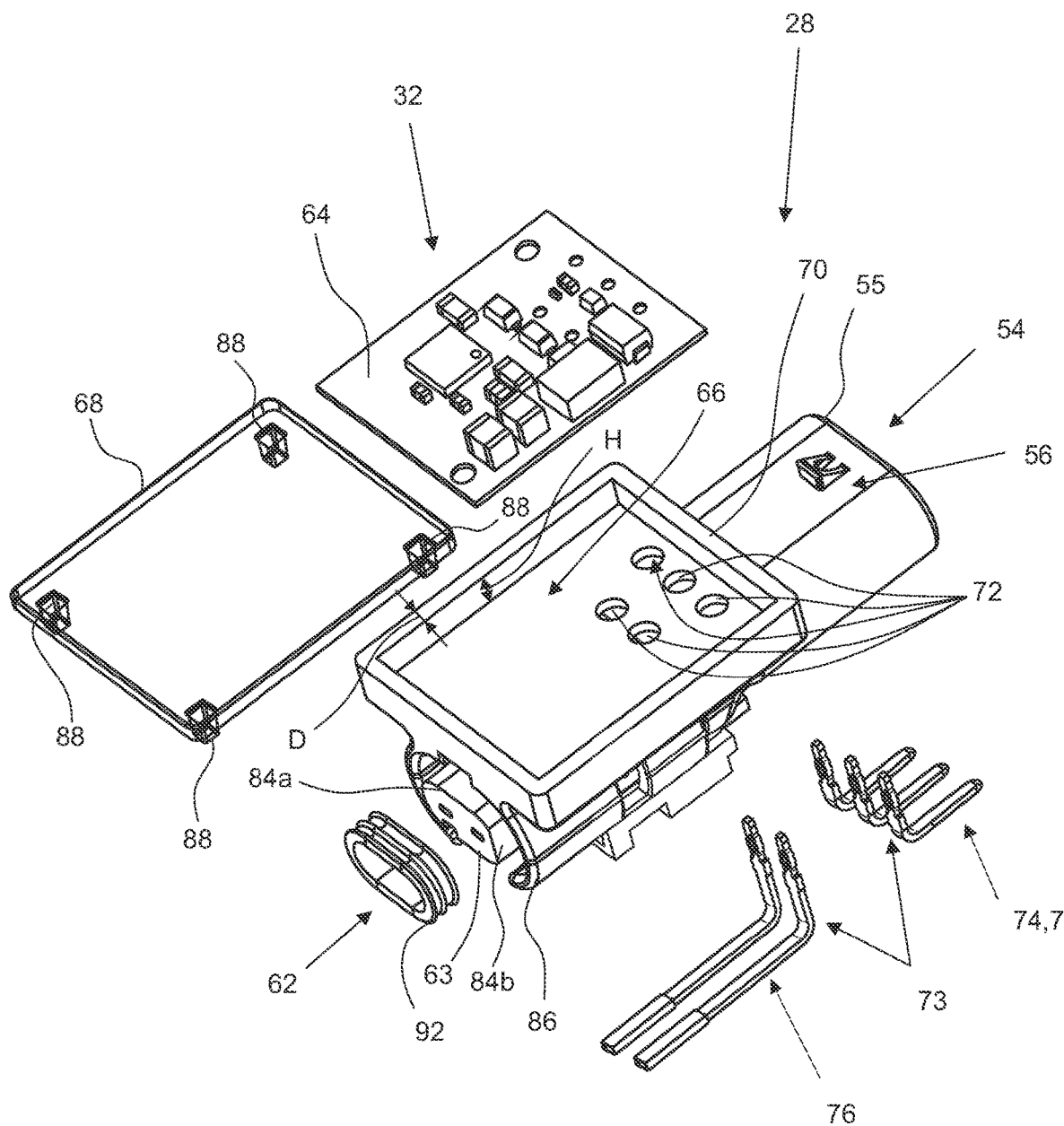
FIG. 7 is the further exemplary solenoid valve adapter disassembled into its components.

From the exploded view of the individual elements of the adapter shown in FIG. 7, it can be seen that the receptacle chamber 66 has through-openings 90 on the base side positioned correspondingly to the contact openings 72 of the circuit board 64, through which an electrical contact between the microcontroller 32 or the transceiver 34, 38 and the data or power cables 74, 76, 78, 80 on the input and output sides is realized. The circuit board 64 is thereby fixed in the receptacle chamber 66, on the one hand, by the contacts passing through its contact openings 72 and, on the other hand, by the hold-downs 88 formed on the closure element 68. In the embodiment shown, the solenoid valve connector 62 further has a sealing element 92 adapted to its outer contour and optionally provided with lamellae, by means of which the adapter solenoid valve connector is protected against moisture.

Figure 8:
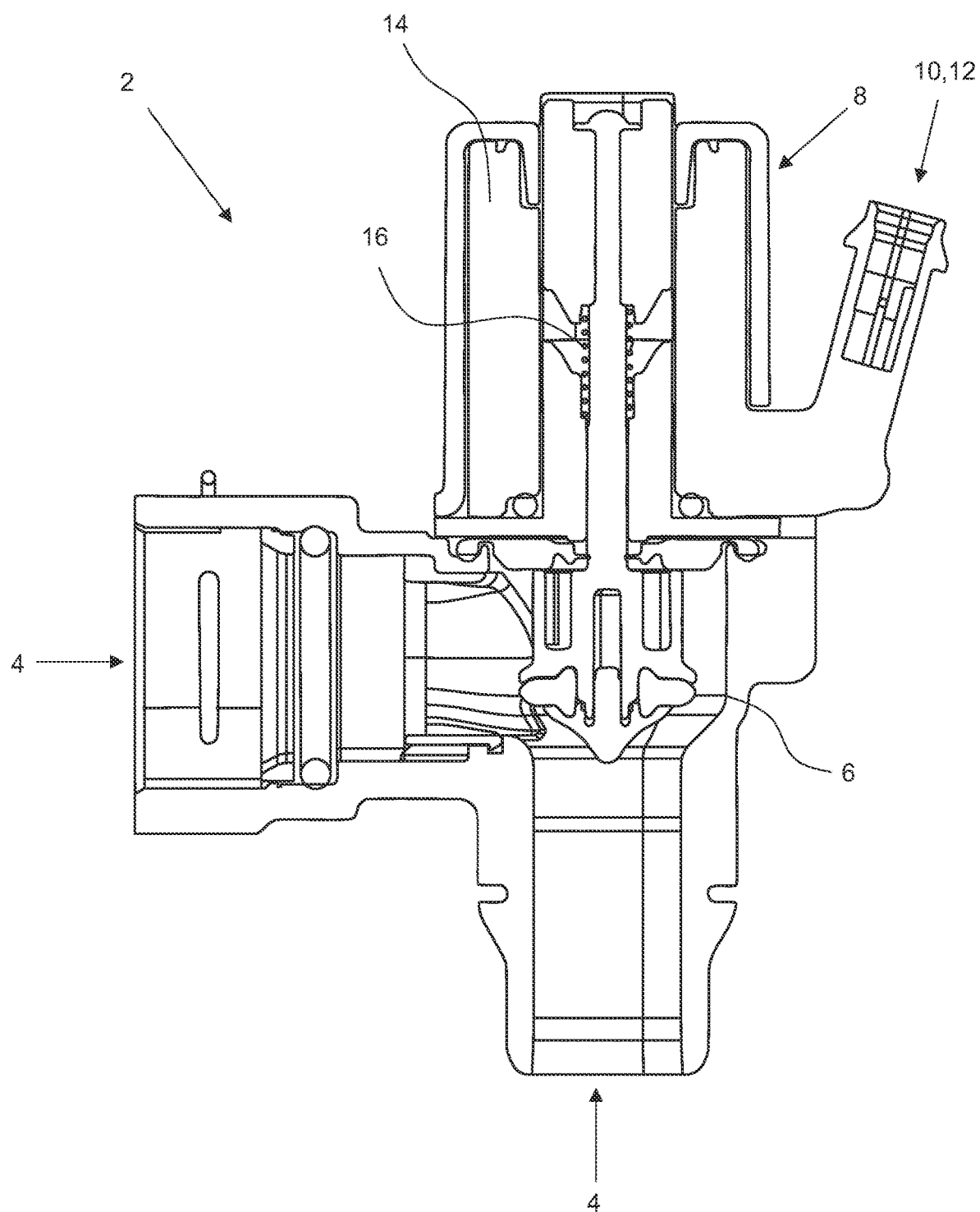
FIG. 8 is a sectional view of a solenoid valve with plug connector.

FIG. 8 shows a cross-sectional view of a "classic" solenoid valve 2 with a fluid line 4, an actuator 6 and an electromagnetic drive unit or operating element 8 by means of which the solenoid valve 2 is controlled. Solenoid valves are used in motor vehicles, particularly in cooling circuits or as recirculation valves for turbochargers. To control the solenoid valve 2, the electromagnetic drive unit 8 essentially has a plug connector 10 with an analog electrical signal input 12 and a solenoid coil 14 for actuating the actuator 6. In this context, the actuator 6 can be transferred from a closed position, in which the actuator 6 closes the fluid line 4, to an open position, in which the actuator 6 releases the fluid line 4. Furthermore, the actuator 6 has a compression spring 16, by means of which the actuator 6 is held in the closed position in an initial position. When a voltage is applied to the solenoid coil 14 via the electrical signal input 12, the force generated by the inductive effect acts on the actuator 6 counter to the force of the compression spring 16, so that the actuator 6 is transferred from the closed position to the open position. The force required to open the valve 2 is set via the current applied to the electrical signal input 12 and, in addition to the compression spring constant, also depends on other operating parameters such as the fluid temperature, the fluid pressure or the valve position, i.e. the current position of the actuator 6.

Figure 1:
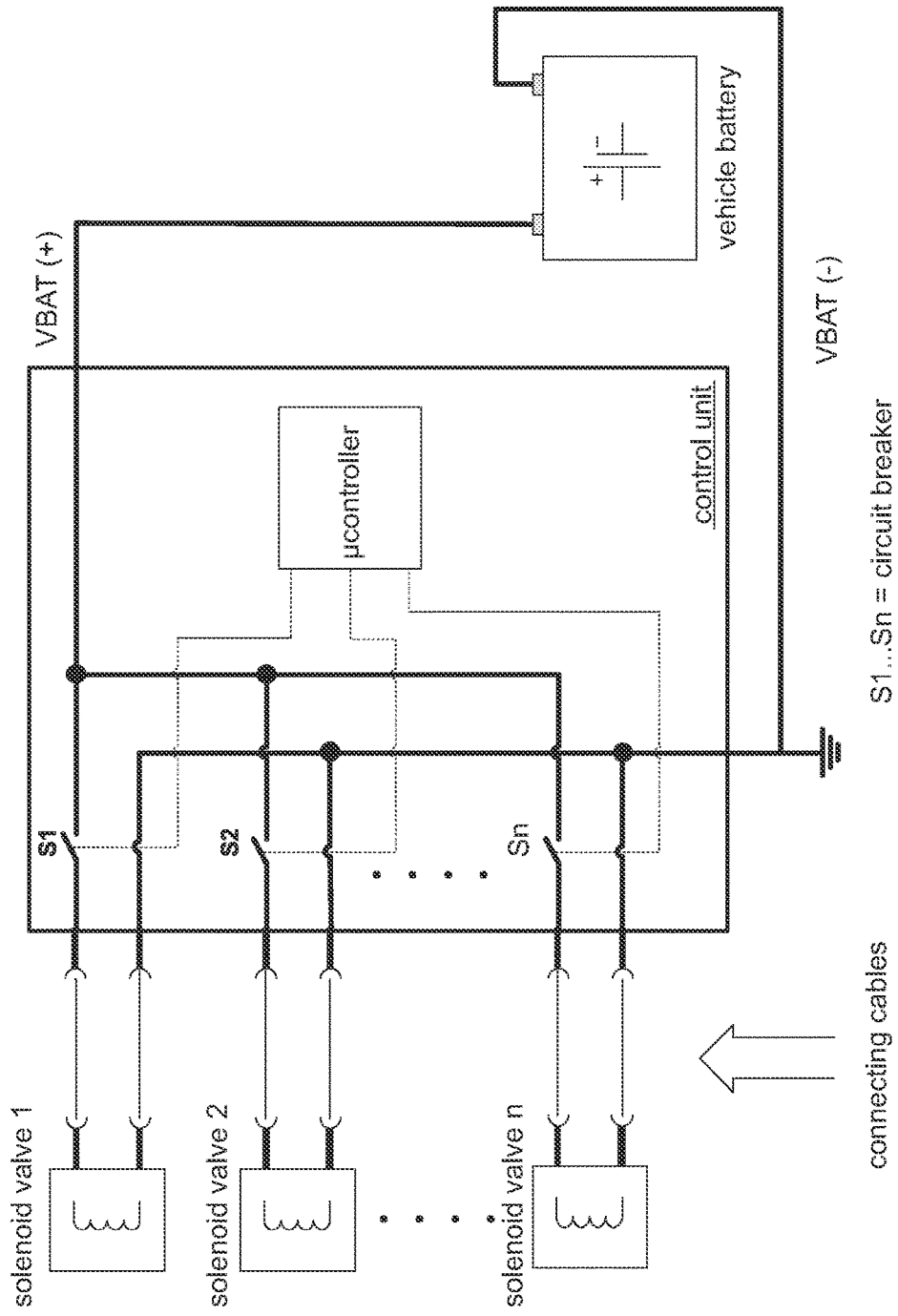
FIG. 1 is a block diagram of a solenoid valve control system.
Figure 9:
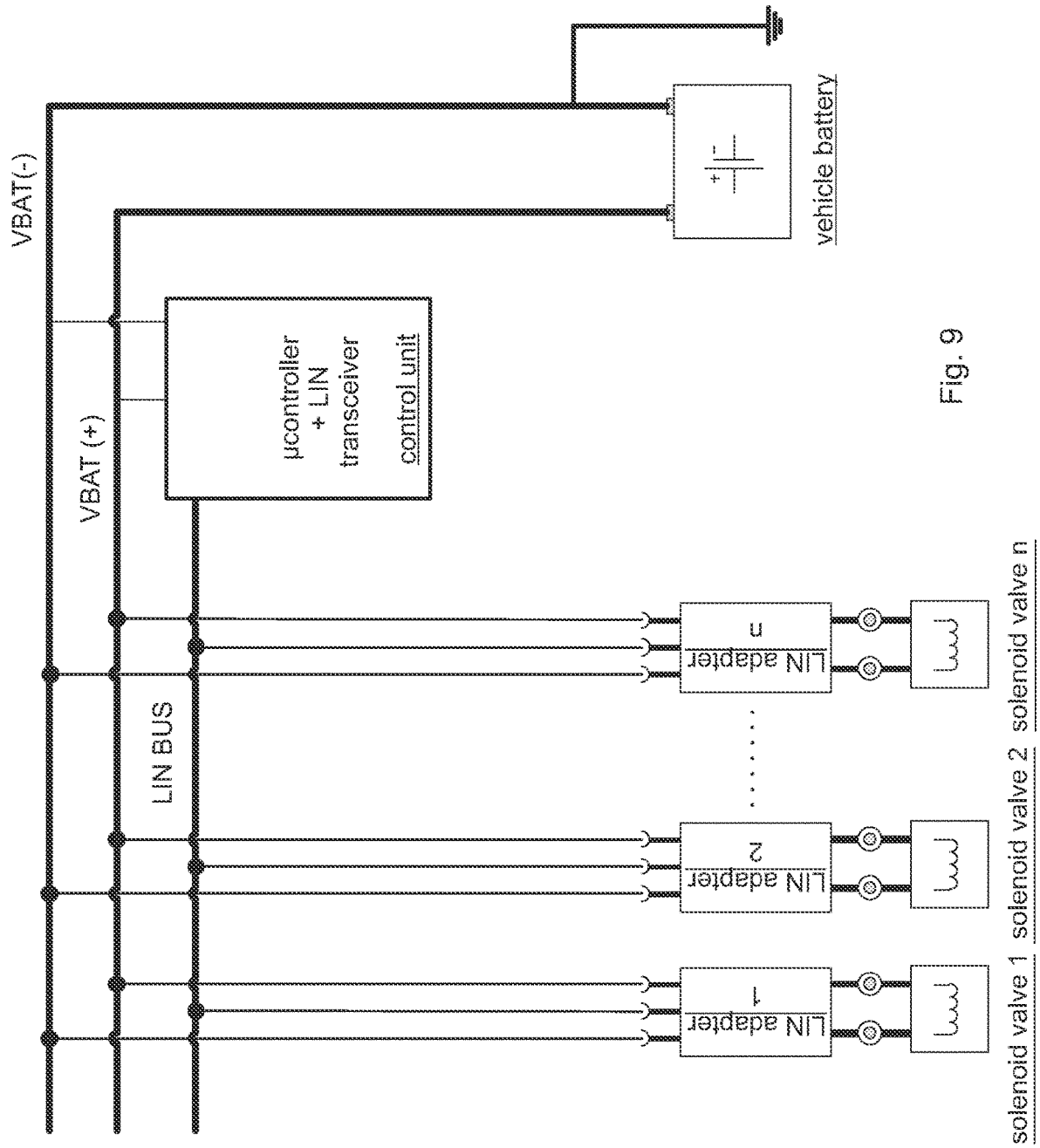
FIG. 9 is a block diagram of a solenoid valve control via a LIN bus.

The block diagram in FIG. 9 shows an arrangement according to one embodiment for controlling "classic" solenoid valves 2. Unlike the arrangement shown in FIG. 1, each solenoid valve 2 is not connected to a separate power output 18 of the control unit, but the valves 2 are connected to a LIN communication bus of a higher-level control unit 20 via solenoid valve adapters 28 attached to the valves 2, and each of the solenoid valves 2 is connected separately to the power supply of the vehicle battery 22 of the motor vehicle. It is particularly advantageous that only a single data interface 30 of the control unit 20 has to be provided for all solenoid valves 1 to N. The solenoid valve adapters shown are connected to a LIN communication bus of a higher-level control unit 20. The solenoid valve adapters 28 shown each have a microcontroller 32 and a transceiver 34 for receiving and transmitting data, the transceivers 34 receiving specific control signals from the control unit 20 for the respective solenoid valve 2 via the LIN communication bus, which are transmitted by the microcontroller 32 via an application-related algorithm into corresponding electrical output signals for transmission to the respective electrical signal inputs 12 of the solenoid valves 2. In this context, the control signals transmitted by the controller 20 may include, among other things, sensor data relating to operating parameters of the respective cooling circuit in which the solenoid valves 2 are embedded, such as a coolant pressure or a coolant temperature. While the solenoid valve adapters 28 receive the data signals necessary for actuating the solenoid valves 2 from the control unit 20 via the serial communication bus, the adapters 28 obtain the power necessary for transmitting the calculated electrical output signals directly from the car battery 22. A further advantage, in addition to the reduced occupancy of control unit outputs 18, 30, is that, in comparison with the arrangement according to FIG. 1, the solenoid valves 2 are not constantly supplied with the maximum current, but the microcontrollers 24, due to the transmission of operating parameters by the control unit 20 and the continuous adaptation thereto in the form of a closed-loop control, can now provide electrical output signals in the current intensity actually required for opening the solenoid valves 2. In addition to saving power, this also leads to reduced wear of the solenoid valves 2.

Figure 10:
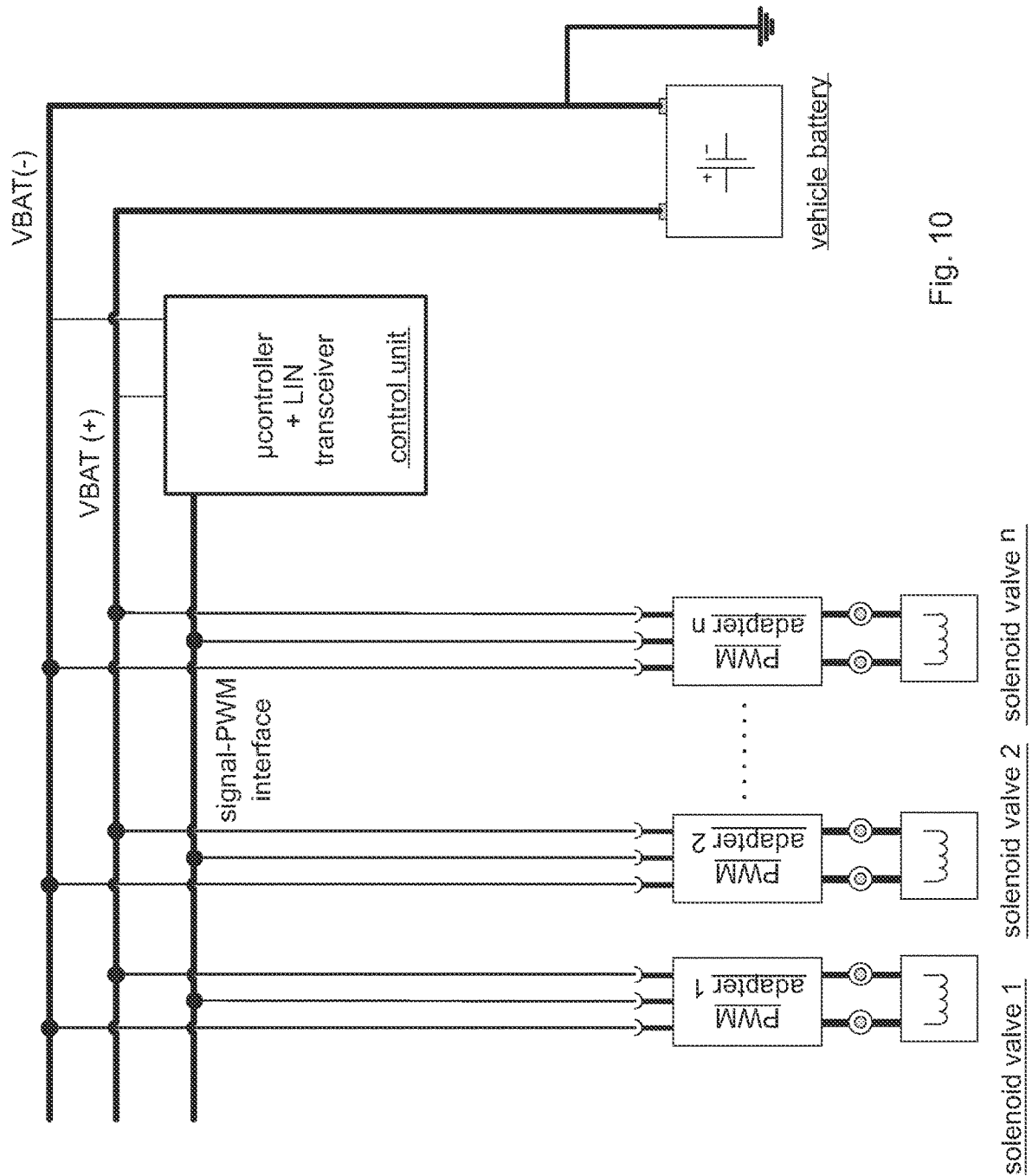
FIG. 10 is a block diagram of a solenoid valve control via a PWM interface.

FIG. 10 shows a further embodiment for controlling solenoid valves 2, the difference between this and the arrangement shown in FIG. 9 being that the solenoid valve adapters 28 are not connected to the control unit via a LIN communication bus, but are controlled by the control unit 20 by pulse width modulation (PWM). For this purpose, the control unit has a pulse width modulation interface 36 to which a serial communication bus is connected, to which in turn the PWM adapters 28 assigned to the respective solenoid valves 2 are connected via a data line.

Figure 11A:
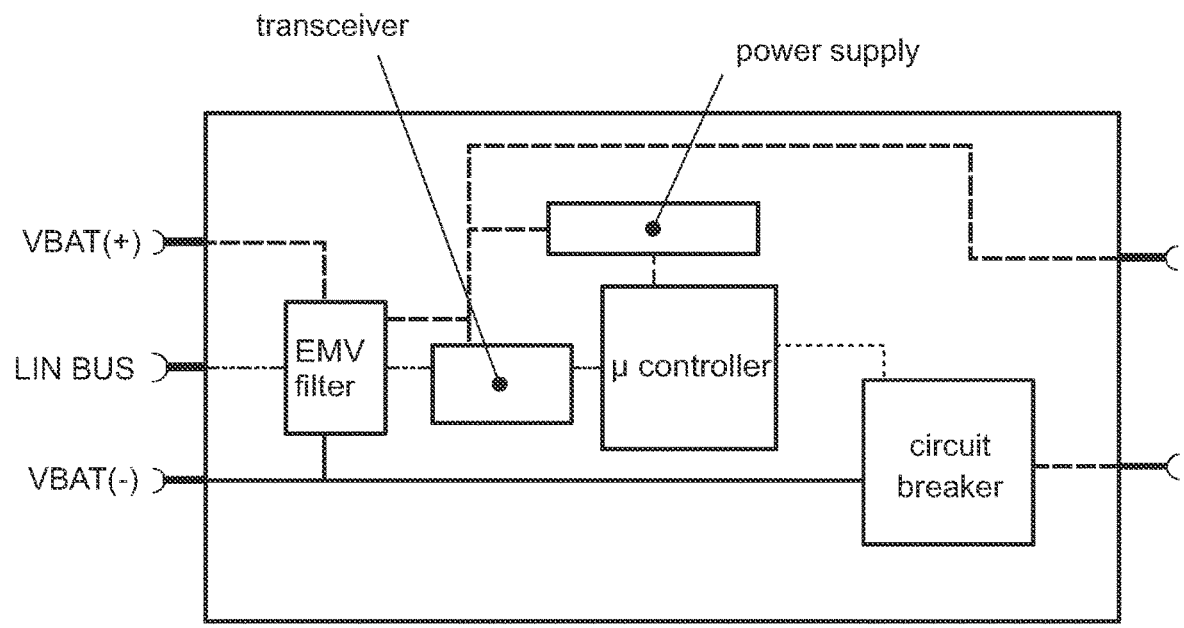
FIG. 11(*a*) is a block diagram of a discrete arrangement of the LIN adapter components.
Figure 11B:
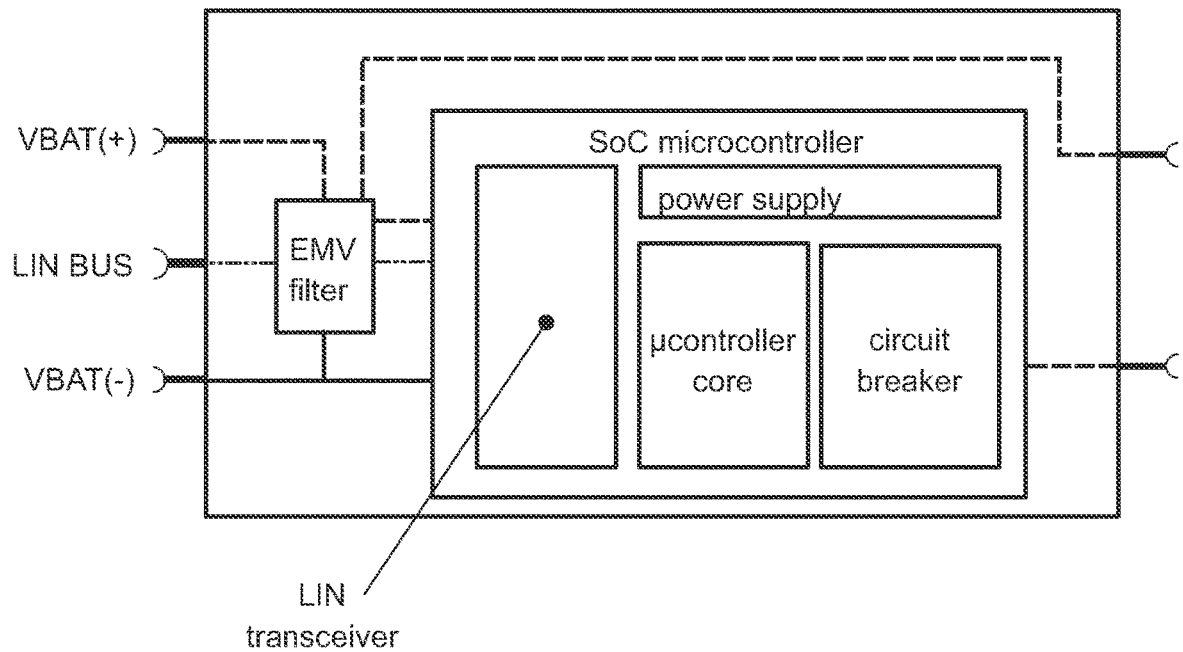
Figure 12A:
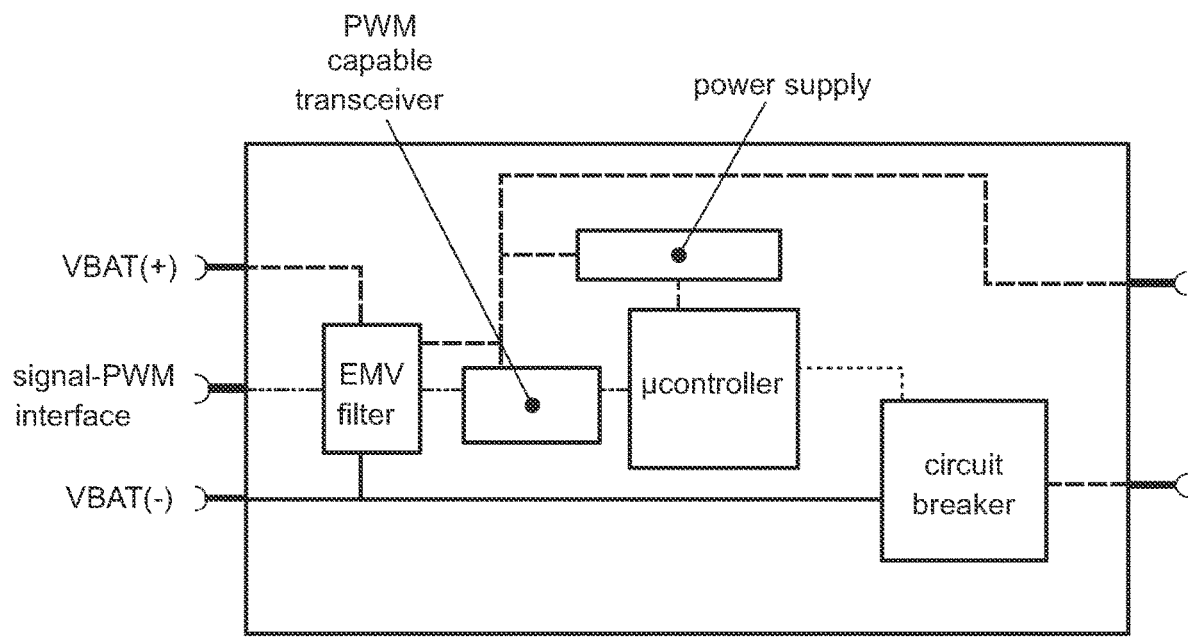
FIG. 12(*a*) is a block diagram of a discrete arrangement of the PWM adapter components.
Figure 12B:
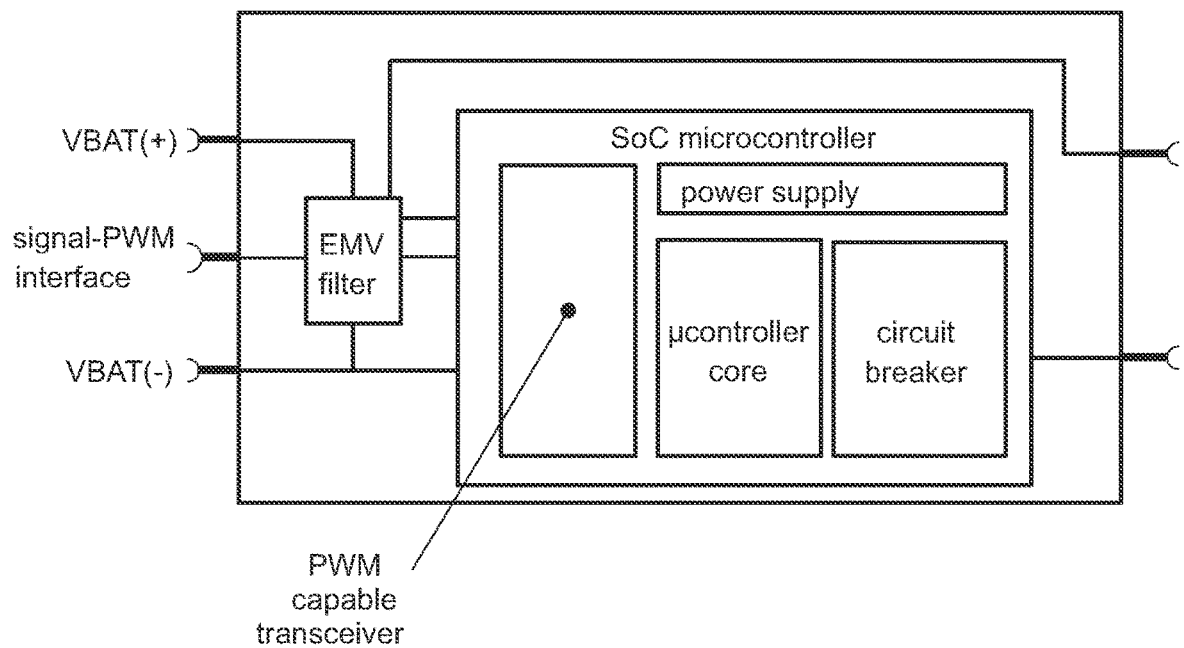

FIGS. 11(a) to 12(b) show different embodiments of the electronic component and the adapter hardware components, respectively, in block diagram representation. FIGS. 11(a) and 11(b) each show a solenoid valve adapter with an electronics component that has a LIN-capable transceiver 34, while FIGS. 12(a) and 12(b) show an adapter with an electronics component that has a PWM-capable transceiver 38. The embodiments illustrated in FIGS. 11(a) and 12(a) show arrangements with discrete components, and the embodiments illustrated in FIGS. 11(b) and 12(b) alternatively feature a system on a chip (SoC) microcontroller 24. The embodiments each include a connector or power input 40 on the input side for connecting to a positive terminal of the car battery 22, a connector or power input 40 for connecting to a negative terminal of the car battery 22, and a connector or data input 42 to the serial communication line, such as to a LIN bus or a signal PWM interface. The adapter may additionally include a data output interface 43 for sending data to the higher-level control unit 20. Other components of the adapter 28 may include an electromagnetic compatibility (EMC) filter 46, a LIN- or PWM-enabled transceiver 34, 38, a power supply 48, a microcontroller 32, and a power switch 26. In the SoC embodiments, the transceivers 34, 38, the voltage supply 48, the microcontroller core 32, and the circuit breaker 26 are each integrated on a chip 50. All embodiments have a positive and a negative pole or a power output 44 on the output side for controlling the solenoid valves 2.

LIST OF REFERENCE SIGNS 2 solenoid valve
4 fluid line
6 actuator
8 electromagnetic drive unit
10 plug connector
12 electrical signal input
14 solenoid
16 compression spring
18 power output control unit
20 control unit
22 car battery
24 microcontroller, controller
26 circuit breaker
28 solenoid valve adapter
30 data interface control unit
32 electronic component/microcontroller adapter
34 LIN transceiver
36 pulse width modulation interface
38 PWM transceiver
40 power input
42 data input
43 data output
44 power output
46 EMC filter
48 voltage supply
50 SoC chip
52 adapter housing
54 plug receptacle
55 border plug receptacle
56 Latching
58 advancing slope
60 latching plate
62 solenoid valve connector
63 male plug
64 circuit board
66 receptacle chamber
68 lid
70 wall
72 contact openings
73 electrical lines
74 current input line
76 current output line
78 data input line
80 data output line
82 latching groove
84a, 84b side sections solenoid valve connector
86 cage
88 Hold-down
90 through-openings
92 sealing element
X main axis
D thickness wall
H height wall
T height latching plate

We claim:

1. A plug adapter for connection to a solenoid valve mounted in a motor vehicle, comprising:
    a plug connector for receiving an electrical control signal from a control unit of the motor vehicle for operating the solenoid valve;
    a solenoid valve connector for releasably coupling the plug adapter to the plug connector of the solenoid valve, wherein the solenoid valve connector and the plug connector are matched to one another by plug shape and by electrical signal transmission;
    an electronic component configured for processing an electrical output signal for operating the solenoid valve; and
    a fluid-tight receptacle chamber comprising a rectangular outline with a wall surrounding the outline and a transparent lid,
    wherein the electronic component is disposed in the fluid-tight receptacle chamber, and the fluid-tight receptacle chamber can be sealed by the transparent lid, further wherein when the plug adapter is plugged into the plug connector, an electrical connection is established between the electronic component and the solenoid valve via the solenoid valve connector.

2. The plug adapter according to claim 1, wherein the solenoid valve connector further comprises a plug piece for plugging into a mating piece of the plug connector in a twisting position, wherein a latching groove is formed on the plug piece perpendicular to a plug direction.

3. The plug adapter according to claim 2, wherein at least one electrical lead is accommodated with a plug section for electrically connecting the electronic component to the solenoid valve.

4. The plug adapter according to claim 2, wherein the fluid-tight receptacle chamber extends substantially in a plane parallel to a plug direction of the adapter, wherein the electronic component is received or fixed in the fluid-tight receptacle chamber in a plane parallel to the plug direction of the adapter and spaced apart from the plug piece.

5. The plug adapter according to claim 1, wherein at least one through-opening is arranged in a chamber bottom of the fluid-tight receptacle chamber for a cable passage of the at least one electrical line or at least one data transmission line.

6. The plug adapter according to claim 5, wherein a circuit board of the electronic component has through-holes into which the electrical lines or the at least one data transmission line are plugged, wherein the circuit board is held in the fluid-tight receptacle chamber.

7. The plug adapter according to claim 3, wherein the lid comprises at least one hold-down device on its side facing the fluid-tight receptacle chamber, wherein the hold-down device holds the electronic component in the fluid-tight receptacle chamber.

8. The plug adapter according to claim 1, wherein the plug adapter is configured for connecting the plug adapter to a higher-level control unit via a serial bus system and for connecting the plug adapter to a car battery of the motor vehicle which has a plug receptacle adapted to a plug of a bus communication line of the serial bus system and of an electrical line connected to the car battery, to which the plug of the bus communication line and the electrical line is electrically or mechanically coupled.

9. The plug adapter according to claim 8, wherein at least one data transmission line establishes a data interface between the higher-level control unit and the electronic component and at least one electrical line establishes an electrical voltage supply between the car battery and the electronic component in the plug receptacle.

10. The plug adapter according to claim 2, further comprising: a housing, wherein the solenoid valve connector and/or the fluid-tight receptacle chamber and/or a plug receptacle are integrally formed with the housing.

11. The plug adapter according to claim 10, wherein the housing has a main axis in the direction of insertion of the plug adapter, the solenoid valve terminal and the plug receptacle being disposed facing away from each other in the main axis (X) at opposite ends of the housing.

12. The plug adapter according to claim 11, wherein the fluid-tight receptacle chamber extends in an L-shape away from the main axis (X) of the housing and is spaced parallel to the plug piece at least in sections.

13. The plug adapter according to claim 10, wherein the housing has at least one undercut latching lug on a housing section surrounding the plug receptacle for latching the plug of a bus communication line, the latching lug having an advancing slope rising in a plug-on direction of the plug and a latching plate which is arranged behind the advancing slope and behind which a complementary mating connector of the plug can engage.

14. The plug adapter according to claim 13, wherein the electronic component is configured to receive at least one bus signal from the control unit via the bus communication line when the plug adapter is coupled to the control unit and to convert the at least one bus signal into at least one electrical control signal for actuating the solenoid valve, and to transmit the electrical control signal from the electronic component to the solenoid valve.

15. A solenoid valve mounted in a motor vehicle, comprising:
    a plug connector for receiving an electrical control signal of a control unit of the motor vehicle for operating the solenoid valve, the plug connector comprising a plug adapter, wherein the plug adapter comprises:
        a plug connector for receiving an electrical control signal from a control unit of the motor vehicle for operating the solenoid valve;
        a solenoid valve connector for releasably coupling the plug adapter to the plug connector of the solenoid valve, wherein the solenoid valve connector and the plug connector are matched to one another by plug shape and by electrical signal transmission;
        an electronic component configured for processing an electrical output signal for operating the solenoid valve; and
        a fluid-tight receptacle chamber comprising a rectangular outline with a wall surrounding the outline and a transparent lid,
    wherein the electronic component is disposed in the fluid-tight receptacle chamber, and the fluid-tight receptacle chamber can be sealed by the transparent lid, further wherein when the plug adapter is plugged into the plug connector, an electrical connection is established between the electronic component and the solenoid valve via the solenoid valve connector.

16. The solenoid valve according to claim 15, wherein the plug connector is configured to engage a latching groove of the solenoid valve connector.

17. The solenoid valve according to claim 16, wherein the solenoid valve further comprises an actuator with an electromagnetically operable actuator and a solenoid coil which is controllable by the electrical control signal.

18. The solenoid valve according to claim 17, wherein the actuator of the solenoid valve closes the solenoid valve in its initial position and can be opened as a result of actuation of the solenoid valve by the electrical control signal.

19. A system comprising:
- a control unit;
- a solenoid valve mounted in a motor vehicle and comprising a plug connector for receiving an electrical control signal from a control unit of the motor vehicle for operating the solenoid valve; and
- a plug adapter comprising:
    - a plug connector for receiving an electrical control signal from a control unit of the motor vehicle for operating the solenoid valve;
    - a solenoid valve connector for releasably coupling the plug adapter to the plug connector of the solenoid valve, wherein the solenoid valve connector and the plug connector are matched to one another by plug shape and by electrical signal transmission;
    - an electronic component configured for processing an electrical output signal for operating the solenoid valve; and
    - a fluid-tight receptacle chamber comprising a rectangular outline with a wall surrounding the outline and a transparent, lid,
- wherein the electronic component is disposed in the fluid-tight receptacle chamber, and the fluid-tight receptacle chamber can be sealed by the transparent lid, further wherein when the plug adapter is plugged into the plug connector, an electrical connection is established between the electronic component and the solenoid valve via the solenoid valve connector.

20. A cooling circuit or turbocharger circuit for a motor vehicle comprising the system according to claim 19.

* * * * *